United States Patent

[11] 3,590,439

[72] Inventor Eskil P. Swanson
    Potter Road, North Kingstown, R.I. 02852
[21] Appl. No. 819,915
[22] Filed Apr. 28, 1969
[45] Patented July 6, 1971

[54] SHUTOFF DEVICE FOR AN INJECTION MOLDING MACHINE
    9 Claims, 11 Drawing Figs.
[52] U.S. Cl. ................................................. 18/30 AC,
    18/30 NW, 137/533.17
[51] Int. Cl. ................................................. B29f 5/04
[50] Field of Search ......................................... 18/30 AP,
    30 B, 30 K, 30 NM, 30, 30 AC; 137/533.17, 496

[56] References Cited
    UNITED STATES PATENTS
    3,344,477  10/1967  Stokis .................. 18/30 X
    3,438,393   4/1969  Godley ................. 18/30 X FOREIGN PATENTS
    42,624   7/1963  Germany ................. 18/30
    392,059  5/1965  Switzerland ............. 18/30

Primary Examiner—J. Spencer Overholser
Assistant Examiner—Norman E. Lehrer
Attorney—Salter and Michaelson ABSTRACT: A shutoff device for use with a rotating feed screw of an injection molding machine including a head portion in which a chamber is formed for directing a plastic material to a mold or die, a pin being located within the chamber, and the pin and head portion having relative movement so that upon rotation of the feed screw during the feeding operation, the feed screw has open communication with the mold or die, but during the injecting operation, the feed screw is sealed against backflow of material from the mold or die.

PATENTED JUL 6 1971

Inventor,
Eskil P. Swanson,
by Salter + Michaelson
Att'ys.

Inventor,
Eskil P. Swanson,
by Salter & Michaelson
Att'ys.

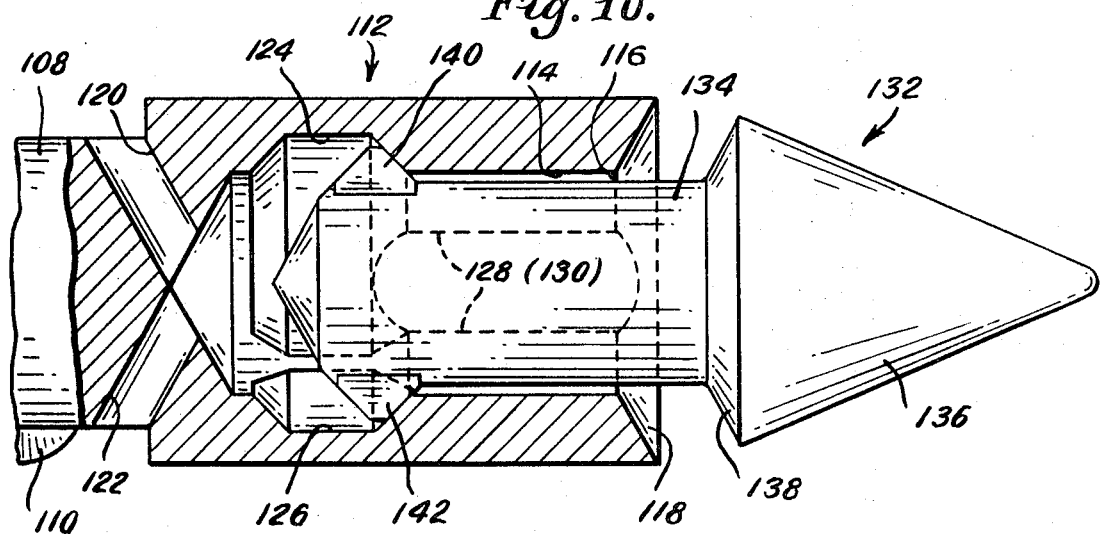
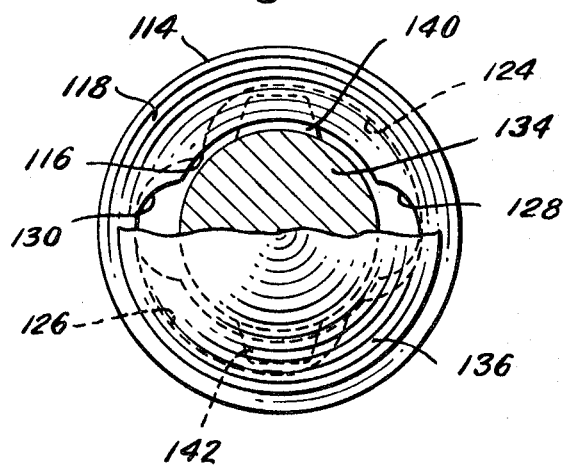

SHUTOFF DEVICE FOR AN INJECTION MOLDING MACHINE

BACKGROUND OF THE INVENTION

The present invention relates generally to injection molding machines which include a rotating feed screw that forces a plastic material through a head portion and then into an injection area wherein the injection molding procedure is carried out.

During feeding of the plastic material by the feed screw through the head portion associated with the feed screw at the end thereof, the prior known devices have normally included some form of restricted opening in the head portion through which the material is forced and a chamber that communicates with an outlet passage. As the material was introduced into the chamber in the head portion it passed through additional passages before entering a mold or die. During the injection molding period, feedback of the plastic material toward the feed screw would have occurred unless the restricted opening was closed so as to close communication between the mold and the feed screw. Heretofore, the prior known injection molding devices have provided some means at the outer tip of the feed screw to prevent the plastic melt from flowing back toward the feed screw during the injection portion of the process, and have normally taken the form of a sliding ring shutoff member, or a ball or plurality of balls which were retained within the plasticizing chamber and defined ball checks. The balls were normally retained in position by pins or the like which required additional structural elements in the device. These prior known shutoff valves were found to be objectional since the mating parts wore within a relatively short period of time, and it was also difficult to assemble and disassemble the head portions when cleaning thereof was required. Furthermore, the use of ball checks increased the possibility of material hang-up and when a retaining pin was employed for retaining the ball checks in place, they were subject to chemical attack by the plastic melt. The sliding ring shutoff members were also subject to attack by the plastic melt and furthermore because of the continuous sliding movement of the member, the rings had a very short life.

SUMMARY OF THE INVENTION

The present invention includes a unique construction formed at the head portion of a feed screw of an injection molding machine, wherein a chamber is defined in the head portion for receiving an elongated pin therein. In the broad concept of applicant's invention, the head portion and pin are movable relative to each other so that during the period when the plastic material is introduced into the mold or die the pin is disposed within the head portion such that flow is induced by the screw into the mold or die. During the molding operation, relative movement of the pin and head portion produces a seal of the head portion chamber by the pin so as to prevent backflow of the material toward the feed screw.

In a more specific form of the invention, the pin is mounted for longitudinal axial movement within the head portion of the feed screw and is located in position by directing lugs formed on the pin within opposed undercut grooves of the chamber, the undercut grooves providing for the longitudinal movement of the pin and further defining an outer limit of movement for the pin. By utilizing an elongated pin on which a seat is formed that cooperates with a sealing surface within the chamber to define a seal, the heretofore known wear problems of the prior shutoff devices are eliminated, and, further, hang-up of plastic material due to backflow is avoided.

Accordingly, it is an object of the present invention to provide a shutoff device for use with a rotating feed screw of an injection molding machine that includes an elongated pin located in a head portion of the feed screw and that cooperates therewith to seal the head portion during the molding operation.

Another object of the invention is to provide an elongated pin as a shutoff device in an injection molding machine that is provided with a tapered sealing surface that cooperates with a corresponding conical seat within an internal chamber to seal the feed screw of the machine against backflow of material during the molding operation.

Another object of the invention is to provide a shutoff device for use in an injection molding machine that includes an elongated axially movable pin that is both easy to assemble and disassemble as required.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 10 is a view similar to FIG. 1 showing still another modified form of the invention; and FIG. 11 is an end view of the head portion illustrated in FIG. 6 with portions broken away.

DESCRIPTION OF THE INVENTION

Figure 1:
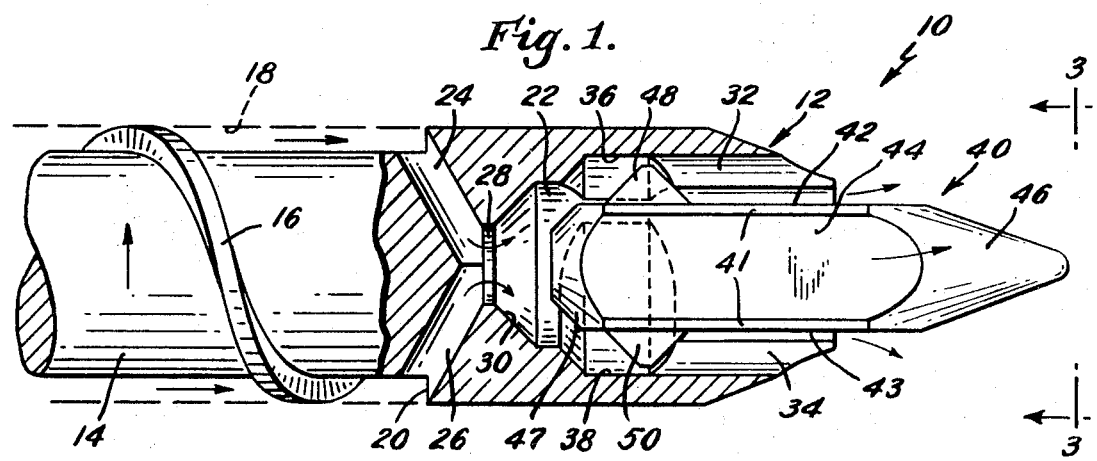
FIG. 1 is a sectional view with portions shown in elevation illustrating the end of a feed screw of an injection molding machine, and showing one form of the shutoff device as embodied in the present invention in the open position thereof.

Referring now to the drawings, and particularly to FIGS. 1 through 4, one form of the shutoff device as embodied in the present invention is illustrated and is generally indicated at 10. The shutoff device 10 includes a head portion generally indicated at 12 that is formed as part of a feed screw 14 which has a helical vane 16 formed thereon in the conventional manner. The feed screw 14 is located within a cylinder, the bore of which is shown in phantom at 18. Although not shown, the head portion 12 associated with the feed screw 14 projects through a suitable opening into a housing of a mold or die, the plastic material that is forced through the head portion 12 being discharged therefrom under pressure of the feed screw into the mold or die during the feeding operation.

As shown in FIG. 1, the head portion 12 is formed as an integral part of the feed screw 14 but is enlarged with respect thereto to define a shoulder 20. F Formed interiorly of the head portion 12 is an internal chamber 22 that communicates with the bore 18 by way of passages 24 and 26. The junction of the passages 24 and 26 with the chamber 22 define a reduced opening 28, a conical seat 30 being located adjacent to the reduced opening 28 and being formed as a part of the chamber 22.

Figure 3:
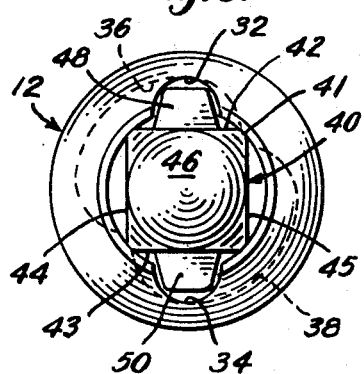
FIG. 3 is an end elevational view of the device illustrated in FIG. 1 as seen along the line 3-3 in FIG. 1.

Extending inwardly from the outermost end of the head portion 12 are circularlike holes 32 and 34 that are disposed in diametrically opposed relation in the head portion. Communicating with the opposed holes 32 and 34 are undercut interior grooves 36 and 38 which, as illustrated in FIG. 3, are located such that the holes 32 and 34 have access thereto at an end of the grooves. The purpose of the undercut grooves 36 and 38 will be described, although as shown these grooves also communicate with the central chamber 22.

Figure 2:
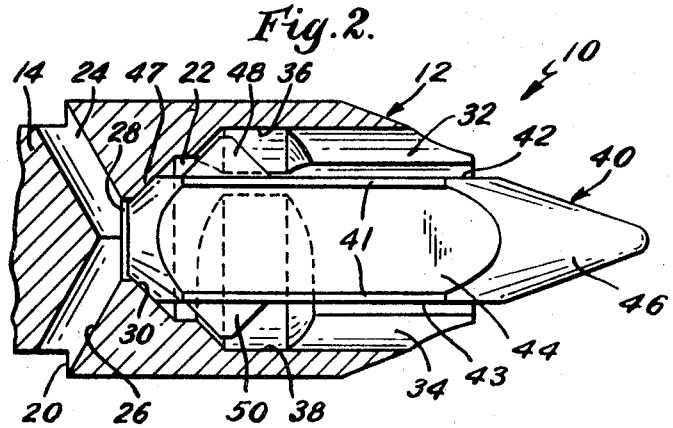
FIG. 2 is a view similar to FIG. 1 showing the shutoff device in the sealing position thereof.
Figure 4:
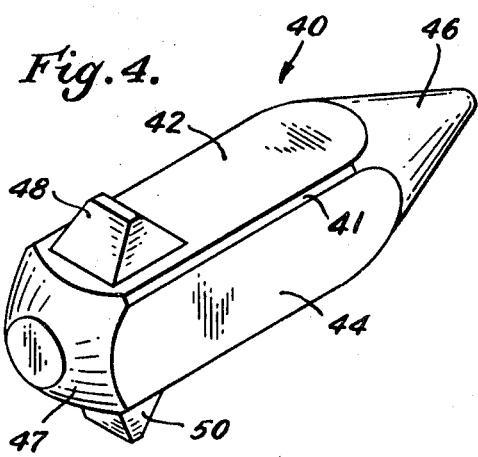
FIG. 4 is a perspective view of the pin embodied in the shutoff device illustrated in FIGS. 1 to 3.

In the molding operation of the injection molding machine, back pressure is exerted on the plastic material located within the chamber 22, and if provision were not made to isolate the feed screw 14, the plastic material in the chamber 22 would backflow through the restricted opening 28, passages 24 and 26, and into the bore 18. As again illustrated in FIG. 1, a pin, generally indicated at 40, is located interiorly of the head portion 12 and is provided for longitudinal slidable movement therein as will be described and cooperates with the head portion 12 to seal the feed screw 14 from the chamber 22. Referring now to FIG. 2, the elongated slidable pin 40 is formed with a body 42 having a tapered nose section 46 at the forward end thereof and a frustoconical portion 47 at the rear end, which as will be described, is adapted to engage the conical seat 30 to form a seal therewith. The cross sectional configuration of the pin 40 is noncircular, and, as illustrated in FIG. 4, is generally formed in a square when viewed in section to define opposed surfaces 42, 43 and 44,45. Formed on the opposed surfaces 42 and 43 of the pin 40 are lugs 48 and 50 that also have a generally tapered configuration as seen in FIG. 4.

One of the advantages of the invention is the ease of assembly of the pin 40 within the chamber 22 of the head portion 12. This is accomplished without the requirement of any fastening elements such as screw members and, as illustrated in FIGS. 1 and 3, the assembly of the pin 40 is performed by locating the opposed lugs 48 and 50 within the corresponding diametrically opposed holes 32 and 34 that are formed in the head portion. The pin 40 is moved inwardly, the lugs 48 and 50 sliding in the holes 32 and 34 until they reach the undercut grooves 36 and 38 that communicate with the holes 32 and 34 respectively. The pin 40 is then rotated with respect to the head portion 12 so that lugs 48 and 50 are moved to the opposite side of the undercut grooves and are thus out of register with the holes 32 and 34. This rotation of the pin 40 is in a direction that would be the same direction of rotation as the feed screw 14 in the operation thereof. Thus the rotation of the feed screw tends to maintain the lugs 48 and 50 of the pin 40 in the undercut grooves 38 and 36 respectively and out of register with the openings 32 and 34. With the pin 40 so located within the head portion 12, axial movement thereof within the chamber 22 is permitted in a forwardly direction at least as far as the forward edge of the undercut grooves 36 and 38 will permit. Rearward axial movement of the pin 40 will seat the frustoconical portion 47 against the conical seat 30 to effect a seal therebetween as seen in FIG. 2.

Although the lugs 48 and 50 are shown in FIGS. 1 and 2 in the undercut grooves 36 and 38 respectively and also in registry with the holes 32 and 34, it is understood that in the actual operation of the device, and as described above, the pin 40 is rotated in the undercut grooves relative to the head portion 12 to locate the lugs 48, 50 out of registry with the holes 32, 34, thereby insuring that the pin will remain in the chamber 22 during axial movement thereof.

It is also seen that with the pin 40 located in the assembled position thereof within the head portion 12, feed passages are formed between the surfaces 42, 43 and 44, 45 of the pin and the adjacent walls of the chamber 22. The material forced by the feed screw 14 into the chamber 22 is then forced outwardly of the head portion 12 through these feed passages as shown by the arrows in FIG. 1, and into the mold or die with which the head portion communicates.

During the molding operation, the plastic material located in the chamber 22 and feed passages that communicate with the mold or die are subjected to a back pressure that normally would force the material to return through the passages 24 and 26 into the bore 18 of the feed screw cylinder. However, as illustrated in FIG. 2, when pressure is exerted on the nose 46 of the pin 40, the pin 40 is moved in a reverse axial direction causing the frustoconical portion 47 to seat against the conical seat 30 in the chamber 22. The restricted opening 28 is then effectively sealed and the material in the chamber 22 is prevented from entering into the bore 18 of the feed screw. Since the pin 40 in effect floats in an axial direction subject to the pressure of the plastic material, it will prevent accumulation of material in the chamber 22 and further it is seen that the pin 40 is not subjected to any wear as it is reciprocated in the axial direction. By using the pin 40, the heretofore known retaining rings and ball valves are avoided and the effective life of the shutoff device is thereby materially increased.

Figure 5:
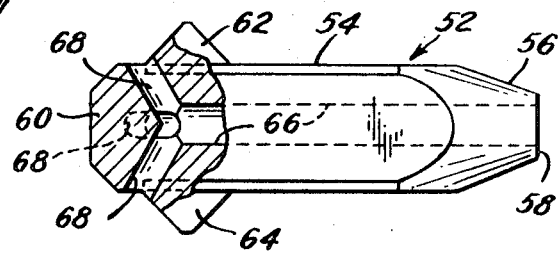
FIG. 5 is an elevational view with portions shown in section of an alternate pin construction for use with the feed screw and head portion illustrated in FIG. 1.

Referring to FIG. 5, an alternate form of the axially movable pin is illustrated and is generally indicated at 52. The pin 52 is formed with a body portion 54, the external configuration of which is generally similar to the pin 40, and is provided with a tapered nose 56 having a flat forward end wall 58 and a frustoconical rear portion 60 that is adapted to be received in sealing engagement by the conical seat 30 in the head portion 12. Opposed lugs 62 and 64 are formed on opposed surfaces of the body portion 54 adjacent to the frustoconical rear portion 60, but contrary to the formation of the pin 40, the body portion 54 of the pin 52 is provided with a central bore 66 that communicates with a plurality of passages 68 formed in the body portion 54 adjacent to the rear end thereof. The passages 68 communicate with the chamber 22 and direct the plastic melt therefrom into the bore 66 for injection outwardly of the pin toward the mold or die. The pin 52 is assembled in the head portion 12 in the manner as described above and is axially movable within the chamber 22 as defined by the limits of the undercut grooves 36 and 38 and in response to pressure of the feed screw 14 or reverse pressure of the flow of the material during the injecting molding operation.

Figure 8:
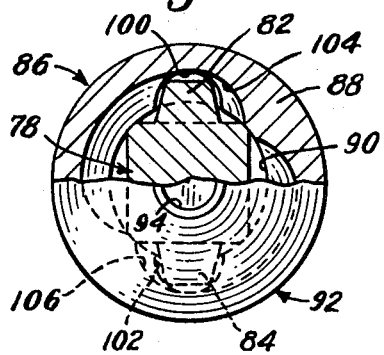
FIG. 8 is an end view of the head portion illustrated in FIG. 6 with portions broken away.

Referring now to FIGS. 6 through 9, a further modified form of the invention is illustrated and includes a feed screw 70 on which a helical vane 72 is formed, the feed screw being disposed in a chamber in which a bore 74 is formed. The feed screw 70 has a tapered end portion 76, the function of which will hereinafter be described, and joined to the tapered end portion 76 is an elongated pin 78 that is noncircular in configuration and that is formed with opposed flat surfaces in a manner similar to that shown and illustrated in FIG. 4. The outermost end of the pin 78 also has a frustoconical configuration indicated at 80, the purpose of which will be described hereinafter. Fixed to opposed surfaces of the pin 78 adjacent to the frustoconical portion 80 are lugs 82 and 84, which function to mount the pin 78 and a head portion generally indicated at 86 in the manner similar to that described above in connection with FIGS. 1—4. Mounted for longitudinal movement on the pin 78 is the head portion 86 that is defined by a body 88 in which a chamber 90 is formed. Joined to the body 88 is a tapered nose portion 92 in which a bore 94 is formed, the bore 94 communicating with the chamber 90 by way of a post section of the chamber 90 in which a conical seat 98 is defined. The rearmost end of the body portion is also formed with a conical seat 99 that is adapted to receive the tapered portion 76 in sealing engagement as will be described. Communicating with the chamber 90 within the body 88 are opposed longitudinally extending semicircular holes 100 and 102 as seen in FIG. 8 that receive the lugs 82 and 84 respectively therein when the head portion 86 is mounted on the pin 78. The longitudinally extending holes 100 and 102 also communicate with undercut grooves 104 and 106 respectively, into which the lugs 82 and 84 are directed when the head portion 86 is locked on the pin 78. Thus in assembling the head portion 86 on the pin 78, the lugs 82 and 84 are received in the holes 100 and 102 and when the head portion 86 is fully located on the pin 78, it is rotated to position the lugs 82 and 84 within the undercut grooves 104 and 106 respectively. The longitudinal dimension of the undercut grooves 104 and 106 permit axial movement of the head portion 86 with respect to the pin 78.

Figure 6:
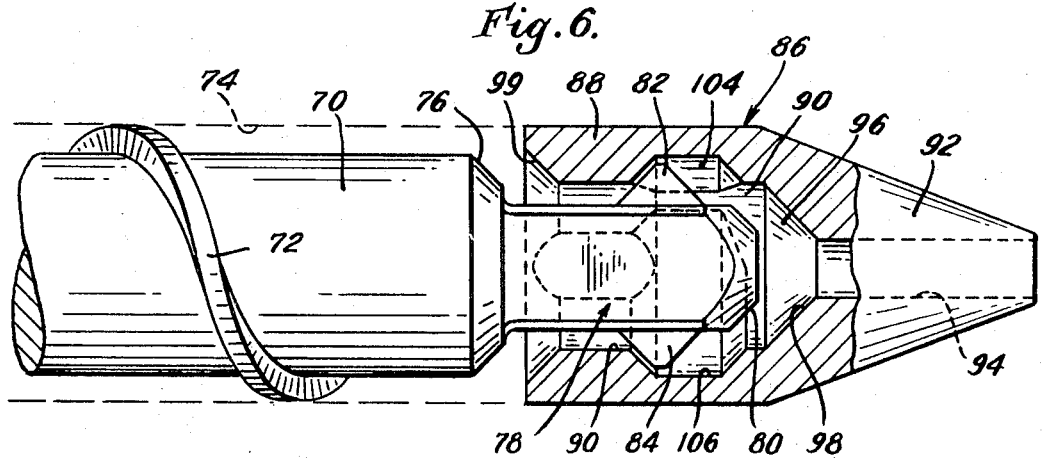
FIG. 6 is a view similar to FIG. 1 showing a further modified form of the invention the head portion being shown in the open position.
Figure 7:
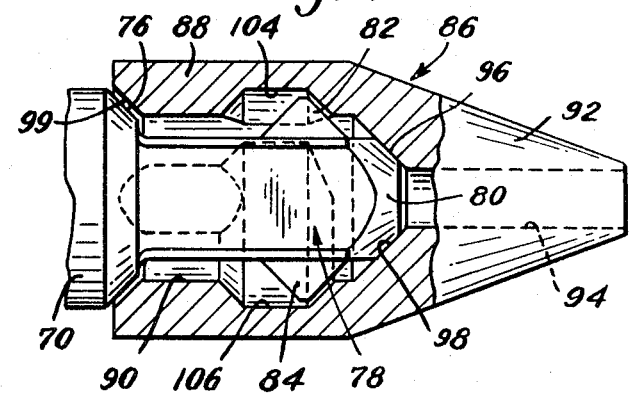
FIG. 7 is a view similar to FIG. 6 wherein the head portion is illustrated in the closed position.
Figure 9:
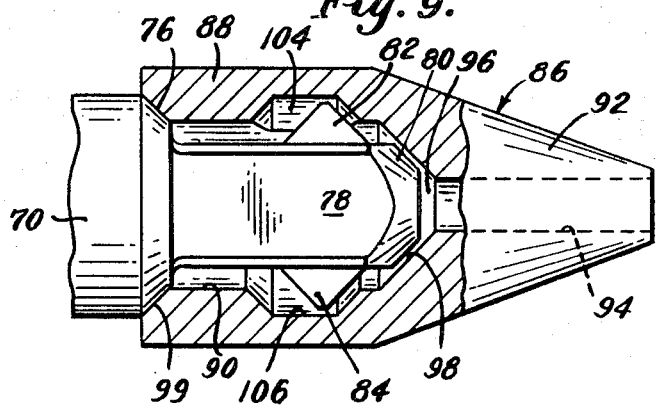
FIG. 9 is a view similar to FIG. 7 showing a further sealing position of the head portion.

During a feeding operation of the plastic material by the feed screw 70 into the mold or die, the head portion 86 is moved to the position illustrated in FIG. 6, thereby providing for open communication of the bore 94 with the bore 74 and consequent feeding of the material into the mold or die. During the injection molding period, backflow of the plastic material forces the head portion 86 rearwardly with respect to the pin 78 and, as shown in FIG. 7, a seal may be established between the frustoconical portion 80 and the seat 98 to thereby seal the chamber 90 from the bore 94. However, it is also contemplated that the tapered portion 76 of the feed screw will seat against the conical seat indicated at 99 to seal the chamber 90 from the bore 74. It is understood that the seal at either the seat 98 or the seat 77 will be effected, depending upon the machining of the head portion 86. In any event, an effective seal will be established by axial movement of the head portion 86 to prevent backflow of the material into the feed screw bore 74.

Referring to FIGS. 10 and 11, another form of the invention is illustrated and includes a feed screw 108 on which a helical vane 110 is formed. Joined to the outermost end of the feed screw 108 is a head portion generally indicated at 112 in which a chamber 114 is formed. The chamber 114 communicates with the mold or die through an opening 116, a conical seat 118 being formed on the end of the head portion 112 adjacent to the opening 116. Passages 120 and 122 are formed in the outer end of the feed screw and extend interiorly of the head portion 112, providing for communication of the bore in which the feed screw is located and the chamber 114. Formed within the head portion 112, are spaced undercut grooves 124 and 126 with which longitudinally extending holes 128 and 130 respectively communicate.

Located within the chamber 114 is an axially movable pin generally indicated at 132 that is defined by a noncircular body 134 to which a cone-shaped nose 136 is joined. The diameter of the base of the nose 134 is somewhat larger than the cross-sectional dimension of the body 134, a chambered or tapered portion 138 being formed therebetween that is adapted to engage the seat 118 in sealing engagement upon reverse axial movement of the pin 132. Formed on opposed surfaces of the body 134 adjacent to the rear end thereof are lugs 140 and 142 that are receivable in the holes 128, 130 respectively when the pin 132 is assembled in the head portion 112. As described above, the pin 132 is rotated with respect to the head portion 112 when the lugs 140, 142 are received within the undercut grooves to locate the lugs out of registry with the holes 128, 130.

In operation of the feed screw 108, plastic material feeding through the passages 120, 122 forces the pin 132 outwardly to provide for flow of the material by the pin and outwardly of the opening 116 into the mold or die. During the molding operation, backflow of the material forces the pin 132 in a reverse direction, thereby seating the chambered portion 138 on the seat 118 to seal the opening 116. Flow of material is thus prevented from entering the chamber 114 and the bore into which the feed screw 108 is located.

I claim:

1. In a shutoff device for use with a feed screw of an injection molding machine, a head portion having a chamber formed therein into which a plastic material is introduced by said feed screw, an opening formed in said head portion and normally communicating with said chamber during feeding of the material by said screw, and an elongated pin located in said chamber, said head portion and pin having relative axial movement in a first direction under pressure of said plastic material during the feeding operation to provide for flow of said plastic material into said chamber and outwardly of said head portion, and having relative movement in a direction opposite to said first direction under pressure of backflow of said plastic material to seal said opening and thereby prevent said plastic material from flowing back toward said screw during the injection period of the injection molding process, said head portion having opposed undercut grooves formed interiorly thereof that communicate with said chamber, and opposed lugs formed on said pin and being receivable in said undercut grooves, said undercut grooves being substantially greater in axial dimension than said lugs, wherein said undercut grooves define limits for said lugs during the relative movement of said head portion and pin.

2. In a shutoff device as set forth in claim 1, the cross section of the major portion of said pin being noncircular, wherein a plurality of flat surfaces are formed on the body of the pin, said flat surfaces cooperating with adjacent walls of said passage to define flow passages for said material during feeding thereof.

3. In a shutoff device as set forth in claim 2, opposed holes formed in said head portion that communicate with the undercut grooves, said opposed holes receiving said lugs therein and providing for locating said lugs in said undercut grooves when said head portion and pin are assembled together, relative rotary movement between said head portion and pin further locking said lugs in said undercut grooves so that the relative axial movement between said pin and head portion can be accomplished without the disassembly thereof.

4. In a shutoff device as set forth in claim 1, said head portion being fixed to said feed screw, said chamber having a conical seat adjacent to said opening defining a sealing surface, said pin being movable relative to said head portion and having a corresponding tapered surface that is engageable with said conical seat during the injection period to prevent backflow of said material into said screw.

5. In a shutoff device as set forth in claim 4, said elongated movable pin having a rear portion on which the tapered surface is formed, and having a tapered forward portion that extends outwardly of said head portion, the lateral dimension of said pin being less than the diameter of said chamber, wherein a flow passage for said material is defined between the walls of said chamber and said pin.

6. In a shutoff device as set forth in claim 4, said pin having a bore formed therein that communicates with said chamber and receives said material therefrom, wherein the material is discharged from the bore in said pin during the feeding operation.

7. In a shutoff device as set forth in claim 1, said elongated pin being joined to said feed screw and having opposed lugs formed thereon, said head portion being mounted on said pin for axial movement relative thereto and having a central bore communicating with the chamber therein outwardly from which the plastic material is directed during the feeding operation.

8. In a shutoff device as set forth in claim 7, a conical surface being located in said head portion adjacent to the opening therein, and a corresponding tapered surface formed on said pin, and cooperating with the conical surface in the head portion to form a seal therewith when said head portion is moved in a reverse direction relative to said pin during the injection molding period.

9. In a shutoff device as set forth in claim 1, said pin having a nose portion formed thereon to which a body is joined, the base of said nose portion having a diameter that is greater than the cross-sectional dimension of said body, wherein a tapered surface is defined therebetween, said chamber having a conical seat adjacent to said opening defining a sealing surface, said pin being movable relative to said head portion in response to backflow of said material, whereby said tapered surface engages the conical seat to prevent backflow of the material in said screw.